United States Patent
Schumi et al.

(10) Patent No.: US 6,372,320 B1
(45) Date of Patent: Apr. 16, 2002

(54) DISC-LIKE PLASTIC BODY WITH INLAY PORTION

(75) Inventors: Christian Schumi, Villach; Josef Pallanits, Drassmarkt; Harald Schermann, Oberloisdorf, all of (AT)

(73) Assignee: HTP High Tech Plastic AG, Neudoerfl (AT)

( * ) Notice: Subject to any disclaimer, the term of this patent is extended or adjusted under 35 U.S.C. 154(b) by 0 days.

(21) Appl. No.: 09/458,335

(22) Filed: Dec. 10, 1999

(30) Foreign Application Priority Data

Sep. 7, 1999 (EP) .............................. 99117607

(51) Int. Cl.[7] .............................. B44C 1/26; G09F 3/02; A63F 3/00
(52) U.S. Cl. ................... 428/67; 428/66.5; 428/66.6; 273/288; 273/148 R; 40/27.5
(58) Field of Search ..................... 428/67, 66.5, 66.6; 40/27.5; 273/288, 148 R

(56) References Cited

U.S. PATENT DOCUMENTS

| 3,968,582 A | 7/1976 | Jones .......................... 40/27.5 |
| 5,676,376 A | 10/1997 | Valley .......................... 273/288 |

*Primary Examiner*—Blaine Copenheaver
*Assistant Examiner*—Kai Vo
(74) *Attorney, Agent, or Firm*—St. Onge Steward Johnston & Reens LLC

(57) ABSTRACT

The invention concerns a disc-like plastic body with inlay portion, essentially consisting of at least one composite filler body holding the inlay portion between itself. A visually pleasing plastic body which is easy and cheap to make is provided according to the invention by the fact that the filler body is encompassed by two lid-like films, one film after the fashion of a cup surrounding the filler body on one side and the other, opposite film after the fashion of a lid being applied to the opposite side of the filler body.

17 Claims, 4 Drawing Sheets

DISC-LIKE PLASTIC BODY WITH INLAY PORTION

Figure 1:
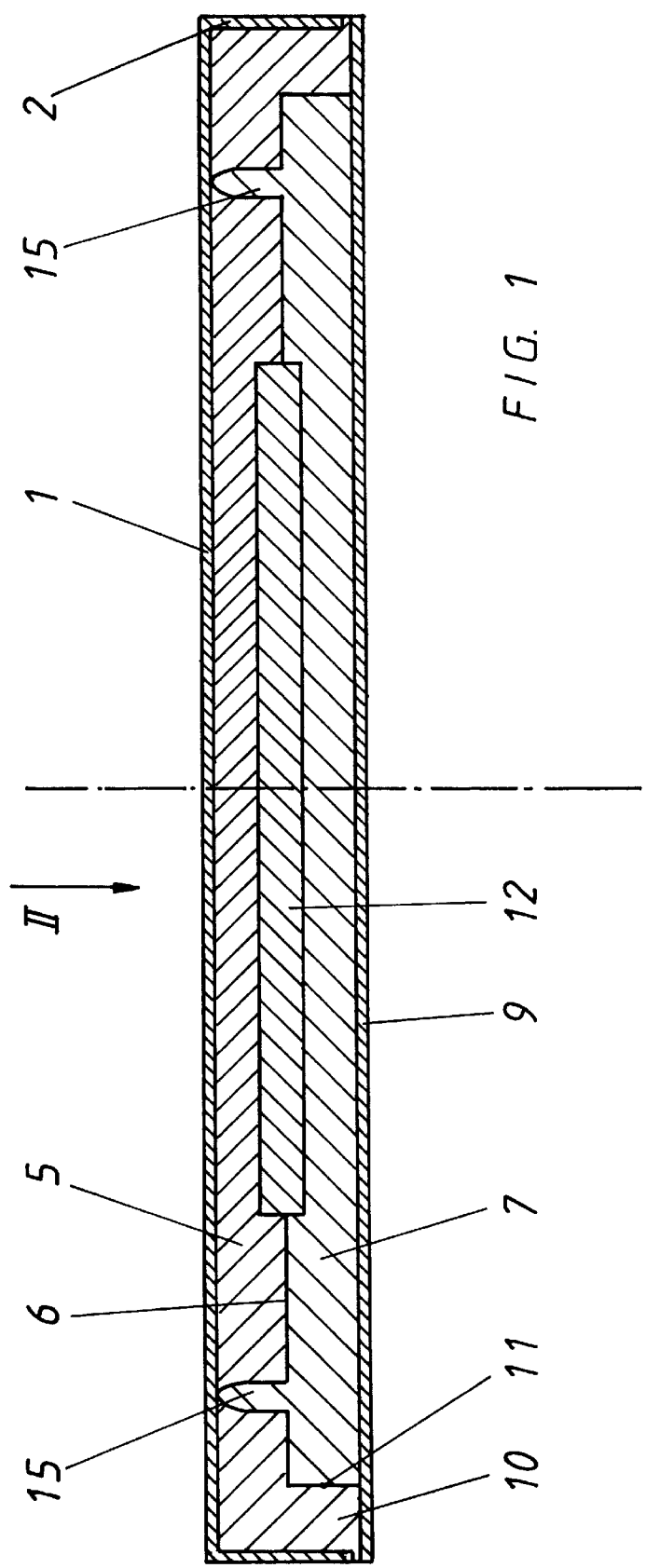

The invention concerns a disc-like plastic body with inlay portion according to the introductory part of patent claim 1. Fields of application of the present subject of invention are for example casino chips, parking tokens, shopping tokens, value tokens, amusement arcade tokens, personalisation tokens, for example as a pass card.

A disc-like plastic body of this kind has for example become known with the subject of EP 444 373 A1. With this known plastic body the inlay portion is inserted in a central recess of an annular plastic body, the inlay portion being pressed into an inner peripheral annular groove of the plastic body and held there. With this technique there is the drawback that there is merely a bonding connection (form-locking connection) between the outer annular portion and the inner filler body (inlay portion), this latching connection not necessarily withstanding high stresses.

Another drawback is that on the plastic body there are of course edge markings in the form of lugs, which however extend upwards from one side only. If therefore it is a question of providing edge markings on such a plastic body, EP 444 373 A1 provides that on the annular outer portion there are attachments which point upwards in an axial direction and which laterally overlap the edge. However, high production costs are associated with this, because in general these attachments have to be formed integrally on the outer peripheral edge, which is associated with high tooling costs.

Moreover high finishing costs are incurred because the attachments cannot be formed integrally on the annular portion in such a way that they fit immediately; appropriate grinding work is necessary to make the attachments e.g. flush with the top surface and integrate them in the top surface.

It is therefore the object of the invention to develop a plastic body of the kind mentioned hereinbefore in such a way that its appearance is more pleasing and furthermore it is to be substantially easier and cheaper to make.

To achieve the stated object, the invention is characterised by the technical instruction of claim 1.

The invention essentially consists in that, starting from a filler body which holds the inlay portion inside it, this filler body is encompassed by two lid-like films, one film after the fashion of a cup surrounding the filler body on one side and the other, opposite film after the fashion of a lid being applied to the opposite side of the filler body.

In this case the cup and/or the lid preferably comprise attachments in each case arranged radially at the outer circumference in a star shape, the cup hereinafter being referred to as a star cup and the lid as a star lid.

With the given technical instruction the result is therefore the essential advantage that the said portions—star cup and star lid—are now formed integrally directly on the filler body in the plastic injection moulding process, with the result that the lateral attachments formed integrally on the star cup can extend around the outer edge lines of the filler body in the injection moulding process and form edge markings.

The edge markings are accordingly formed by the radial, outwardly directed attachments of the upper and/or lower star film and during the injection moulding process are pulled around the outer edges of the filler body and injection-moulded in one piece with the material of this filler body.

Hence there is an absolutely reliable bond between the radially outer attachments and the edges of the filler body, and no finishing of a plastic body made in this way is necessary.

In EP 444 373 B1, as mentioned, finishing had to be done because the radial attachments which form the edge markings had to be inserted and not attached by injection moulding. Only a latching connection which was not injection-moulded was therefore involved, with the result that the durability and wear resistance of the plastic body suffered.

Another advantage of the present invention lies in that, by contrast with EP 444 373, the inner filler body is no longer held in a form-locking connection in a peripheral outer body, but only encompassed and enclosed from both sides (top surfaces) by the above-mentioned star cup film and the star lid film.

This encompassment and enclosure take place during the injection moulding process, i.e. the said films are attached by injection moulding to the filler body in the injection moulding process, with the result that there is a material locking bond and the materials of the film and filler body interlock and mesh with each other, which was unknown in the state of the art.

Hence there is an absolutely tight connection of the filler body to the upper and lower lid film bodies, integral with the material, which was previously unknown in the state of the art.

Because according to the invention on at least one of the lid films are arranged radial edge attachments which are bent round during injection moulding and attached to the peripheral edge of the filler body by injection moulding, the result is an edge of the plastic body made by this means that can be subjected to extremely high stresses, with the advantage that the edge markings which are formed by the attachments are highly wear-resistant, abrasion-resistant and capable of free graphic design, wherein they can be designed either in the colour of the lid films or in any other colour.

Due to the fact that the filler body extends over the whole surface of the plastic body (and is not located just in the centre region), a substantially greater volume and weight of the filler body are achieved. This is one of the essential requirements of amusement arcade tokens which must have a certain minimum weight. With the subject of the present invention this minimum weight can very easily be achieved, for the filler body extends practically over the whole outside diameter of the games token and is not just confined to a central region.

Because there is now a higher volume available for the filler body, there is also no need for expensive materials that make the filler body a specific weight such as e.g. barium sulphate, but cheaper and lighter filler body materials can be resorted to. There is now the possibility of using a plastic material which is doped with zinc, as well as other heavy filler materials such as e.g. clay, glass, liquid fillers, chalk, powdered fillers and the like.

Particularly preferred here is a filling with polyamide-zinc, zinc in powdered form being introduced into a liquid polyamide plastic melt in a ratio of preferably 80% to the polyamide composition (measured gravimetrically). Other mixture ratios are possible as well.

Such a filler body can also be made by plastic injection moulding, has a very stable shape and is therefore suited to receiving an inlay portion between itself, without it being necessary also to use special further measures for the strength of the filler body.

In addition to forming the material of the filler body from a polyamide zinc compound, a polybutylene terephthalate zinc compound can be used as well. This last-mentioned compound PBTP in combination with the above-mentioned zinc powder also leads to the result that the central filler body consisting of the upper portion and the lower portion can be made as a stable plastic portion which receives the inlay portion inside it.

The filler body is in particular designed in two portions, for it consists of a filler body upper portion and a filler body lower portion belonging thereto, the two portions being joined and/or meshed together in form-locking relationship. Form-locking meshing of this kind can be achieved for example by interlocking mortise and tenon joints, by adhesive joints, by friction-locking joints such as e.g. "bayonet", or press stud joints or joints by injection moulding technology with a plastic composition.

Here the nature and construction of the inlay portion are not important. The inlay portion can be for example a transponder which consists of a single-layer or multi-layer coil in whose interior is arranged a microprocessor which ensures transmitting and receiving operation. The inlay portion can also be an ordinary filler portion or be completely omitted, providing a passive chip.

Naturally the material of the filler body should not shield the inlay portion electrically if the inlay portion is designed as a transponder, as transmitting and receiving operation would suffer from this.

If on the other hand such a transponder is dispensed with, metal shielding is not important.

For the design of the decorative lid films and decorative laminates (star cup and star lid), films that can be injection-moulded and graphically designed (e.g. printed on) are used, with relative freedom in the film thickness. In this case film thicknesses within the range of for example 100–300 $\mu$ can be used.

The surface of the film should preferably be satin-finished and/or have a high gloss.

Naturally these films can be printed on by all known printing methods. Safety printing methods can be employed too, and additional pigments, colour mixtures and the like can be used.

The invention is however aimed at the general structure of the plastic body, so that the design of the films themselves is not important.

Inter alia, the following further advantages arise with the present invention:
- attainable weight easily +/−10 grammes, with choice of materials polypropylene with 50% glass; polyamide and polyoxymethylene with the addition of barium sulphate in the region of 70% would be possible too.
- very exact colours and colour fidelity possible, with very strong shades of colour
- good abrasion resistance, first and foremost of the edges (white fracture) and of the graphic design
- very large advertising area of the film
- good chemicals resistance
- good light-fastness
- good stacking capacity
- good prevention or difficulty of forgery
- no need for metal fillers, therefore use of transponders as inlay portion quite easily possible
- pleasant sound, when used as a games token
- pleasant haptics: the "handle" and the surface or feel is high-quality and sympathetic
- variable dimensions: 36 and 40 mm in EU standard, also with 34, 38, 43, 45 mm diameter.

The subject of the present invention results not only from the subjects of the individual patent claims, but also from the combination of the individual patent claims with each other. All the particulars and characteristics disclosed in the documents including the abstract, particularly the three-dimensional construction shown in the drawings, are claimed as essential to the invention as far as they are novel individually or in combination compared with the state of the art.

Figure 2:
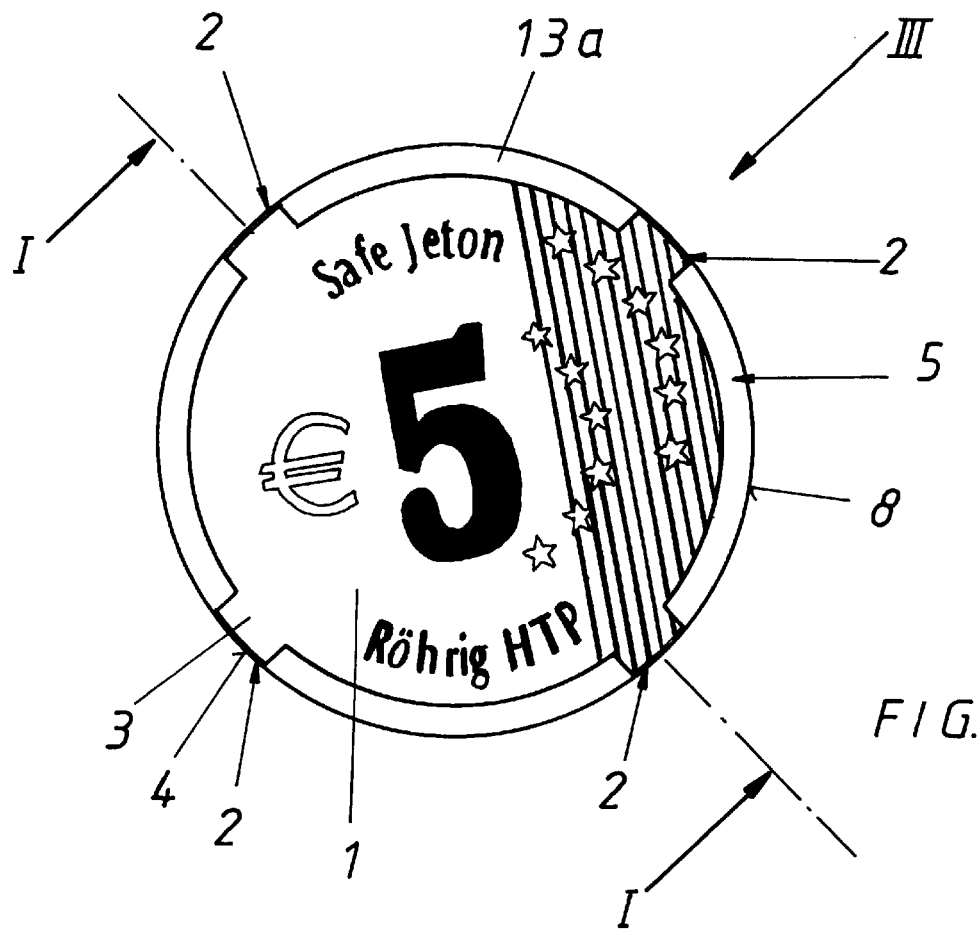
Figure 3:
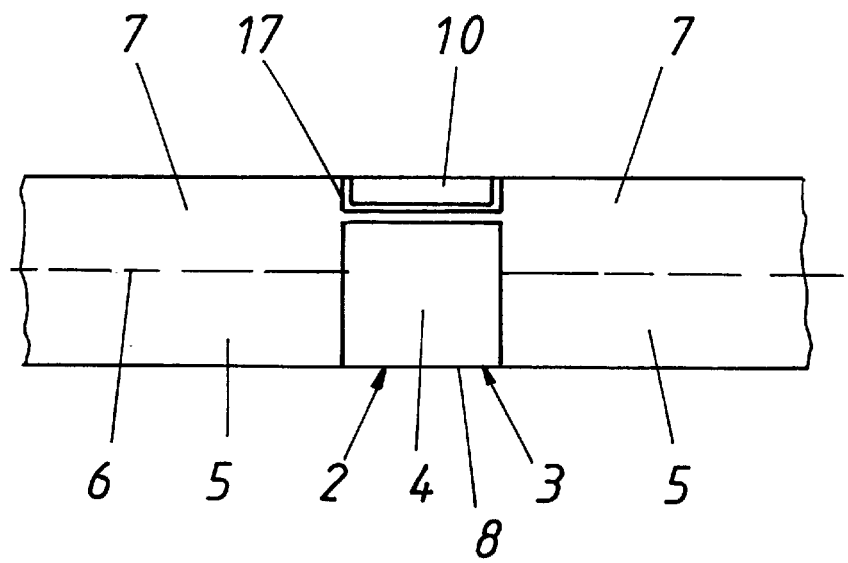
Figure 4:
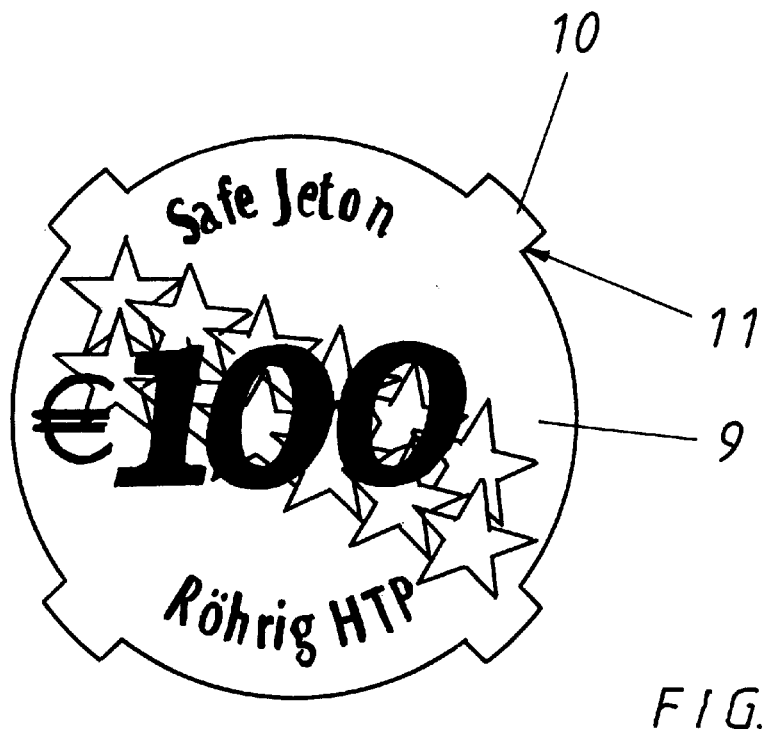
Figure 5:
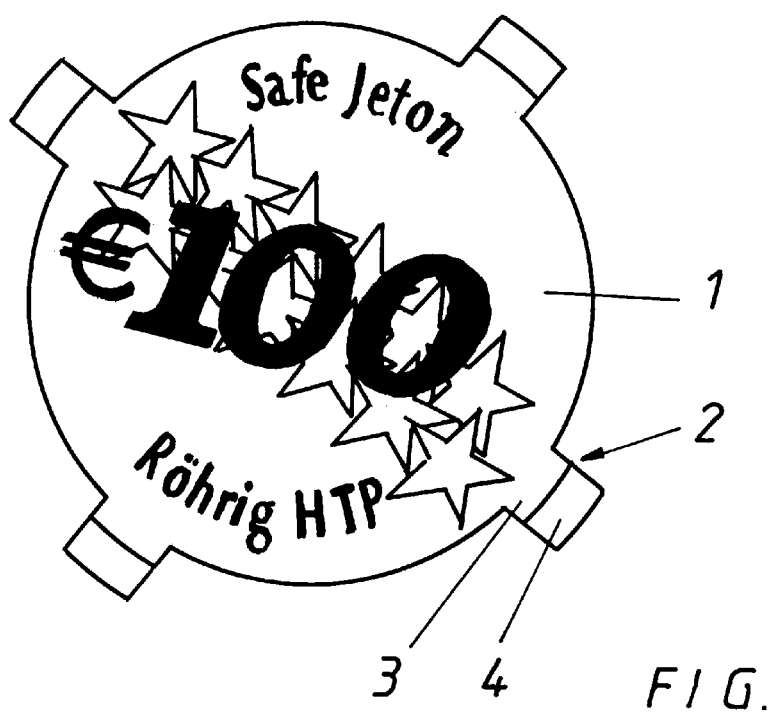
Figure 9:
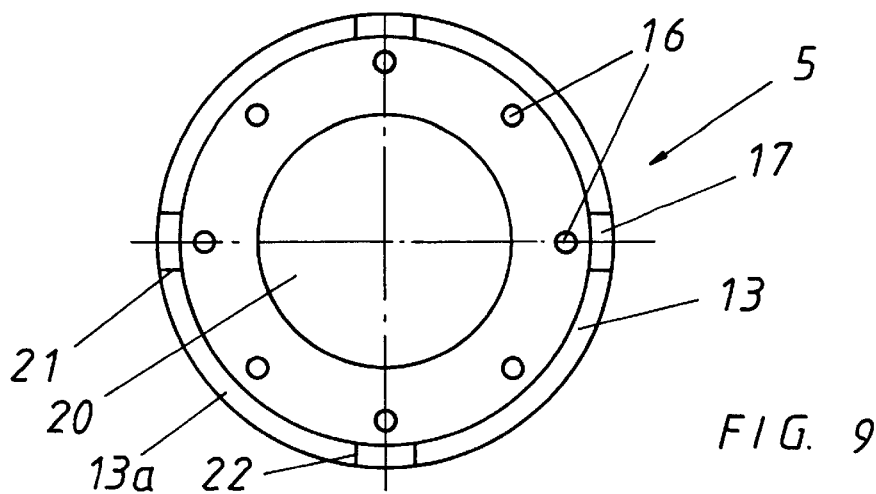
Figure 7:
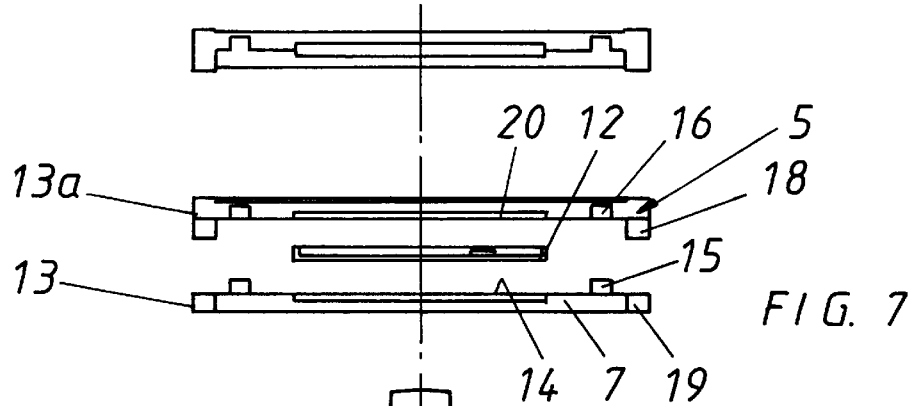
Figure 6:
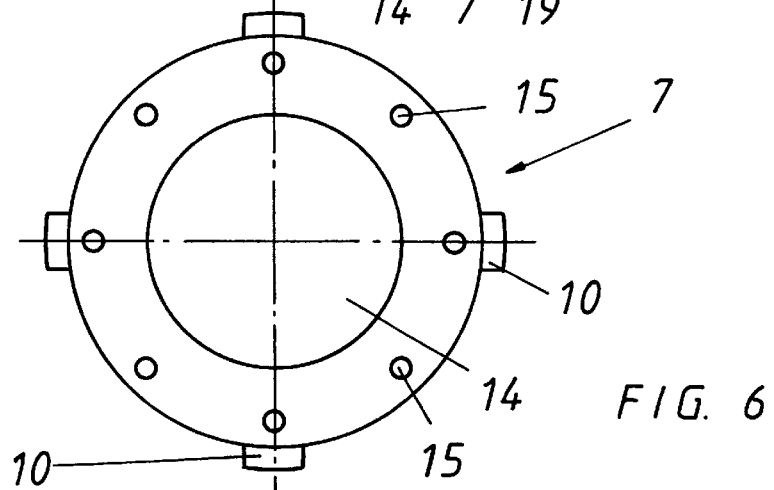
Figure 8:
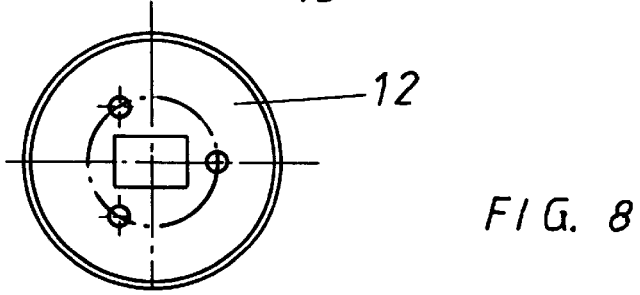

Below, the invention is described in more detail with the aid of drawings showing only one embodiment. Here, further characteristics essential to the invention and advantages of the invention are apparent from the drawings and their description. They show:

FIG. 1: section through a plastic body according to the invention along line I—I in FIG. 2:

FIG. 2: top view of the plastic body according to FIG. 1;

FIG. 3: side view of the plastic body in the direction of the arrow III in FIG. 2;

FIG. 4: top view of the star lid;

FIG. 5: top view of the star cup;

FIG. 6: top view of the filler body lower portion;

FIG. 7: side view of filler body lower portion and filler body upper portion with inlay portion in between;

FIG. 8: top view of the inlay portion;

FIG. 9: top view of the filler body upper portion.

In FIG. 1 is shown the general structure of a plastic body which is the subject of the invention, which essentially consists of a two-part filler body with filler body lower portion 7 and filler body upper portion 5. For this, attention is drawn to FIGS. 6 and 9 where the two filler body portions 5, 7 are shown in more detail.

The filler body lower portion 7 according to FIG. 6 essentially consists of an annular body which defines a central recess 14 which however does not break through the body, but is only applied in a dish shape, as shown in FIG. 7 in section.

In this recess 14 is laid an inlay portion 12 which is held by a corresponding recess 20 in the inside of the filler body upper portion 5 opposite.

The two portions 5, 7 can be latched together, wherein on the lid surface of the filler body lower portion 7 are arranged corresponding axially upwardly directed knobs 15, preferably distributed regularly over the circumference, which engage in and can be latched to associated recesses 16 on the inside of the filler body upper portion 5.

The purpose of the portions associated with each other and interlocking in form-locking relationship, the knobs 15 on the one hand and the recesses 16 on the other hand, is that coordination of upper and lower portions 5, 7 which is unambiguous and if necessary in the correct position takes place in the subsequent injection moulding process, so that these portions are joined together in one piece with the material and in material-locking relationship and can no longer be detached. They therefore fuse together and enclose between them the inlay portion 12 which can for example contain a transponder.

In addition the two filler body portions 5, 7 each form peripheral edges 13, 13a or edge segments; from FIG. 7 it can be seen that the edge segment 13a extends for example respectively from position 21 to position 22 and between two adjacent edge segments 13a, 13 there are corresponding outwardly opening edge recesses 17 in which later engage the radial attachments 10, 2, yet to be described, of the cover films 1, 9, yet to be described.

Further can be seen e.g. in FIG. 7 on the filler body upper portion 5 an axially downwardly directed edge attachment 18 which engages in an associated outwardly opening edge recess 19 of the filler body lower portion 7, so that the two filler body portions 5, 7 interlock in form-locking relationship and complement each other.

This is also apparent from FIGS. 1 and 3 where it can be seen that the two portions 5, 7 exhibit a virtual dividing line 6 which fuses during the plastic injection process, so that it is no longer visible.

According to the invention the upper cover film, which encloses the filler body upper portion 5 from above, is designed as a star cup 1. By the term "star cup" according to FIG. 1 and FIG. 5 is meant a film on which there are radially outwardly pointing attachments 2 distributed over the circumference at regular intervals.

These attachments can be different colours, i.e. they can be formed from one section 3 and a further section 4 radially further out.

Here it is important that the section 3 for example extends only as far as the outer edge 8 (see FIG. 3) and is kept in a certain first colour as also shown in FIG. 2, while the section 4 bent at right angles thereto is kept in a different colour and essentially according to FIG. 3 forms the rectangular edge marking of the whole plastic body.

The width of this attachment 2 can be chosen as desired. Nor do attachments 2 have to be distributed evenly over the circumference, but they can also be arranged unevenly or have different widths.

On the opposite side is arranged the star lid film 9 which also comprises radially outwardly directed attachments 10 which however are shorter in their radial extent than the above-mentioned attachments 2.

As a result, these attachments 10 extend only as far as the outer boundary edge 8 of the plastic body, as can also be seen in FIG. 3, so that only the narrow end face of these attachments 10 can be seen when looking at the edge of the filler body.

It is important that said attachments extend into the edge recesses 17 of the filler bodies 5, 7 and end flush with the edge, so that they do not protrude beyond the outer boundary of the filler bodies. By this means a unitary continuous edge joint is formed in the injection moulding process, the attachments no longer being distinguishable from the peripheral edge in their dimensions. They therefore merge with the peripheral edge of the filler bodies 5, 7 flush and without a gap, and this results in the high wear resistance of the plastic body according to the invention, because in the injection moulding process these attachments 2, 10 are injectionmoulded with the filler bodies 5, 7 in the region of the edge recess 17 and there produce a material-locking joint.

Naturally the present invention is not confined just to the fact that the star cup 1 comprises attachments 2 with a relatively long radial length, while the star lid 9 according to FIG. 4 comprises radially shorter attachments 10. It is also quite possible for the attachments 2, 10 to have a different length, i.e. attachments 2 of relatively long radial length can also lie opposite attachments 10 of the same radial length and these attachments can be offset from each other, so that the attachments laterally overlap the filler body 5, 7 both from above and from below and are joined to the latter flush at the edge.

LEGEND OF DRAWINGS 1 star cup
2 attachment
3 section
4 section
5 filler body upper portion
6 dividing line
7 filler body lower portion
8 edge
9 star lid
10 attachment
11 edge
12 inlay portion
13 edge 13a
14 recess
15 knob
16 recess
17 edge recess
18 attachment
19 recess
20 recess
21 position
22 position

What is claimed is:

1. A disk-shaped plastic body with an inlay portion, comprising at least one composite filler body holding the inlay portion within itself, wherein the filler body (5, 7) is encompassed by two films, one film having a cup shape (1) surrounding the filler body (5, 7) on one side and one film having a lid shape (9) being applied to the opposite side of the filler body.

2. A disk-shaped plastic body according to claim 1, wherein the cup-shaped film is mechanically or pneumatically hollowed out in an external process or when laid in a mold cavity of an injection molding tool.

3. A disk-shaped plastic body according to claim 1, wherein the cup-shaped film (1) and/or the lid-shaped film (9) comprise attachments (2) in each case arranged radially at the outer circumference in a star shape.

4. A disk-shaped plastic body according to claim 3, wherein the attachments (2) are formed from a first section (3) and a further section (4) radially further out.

5. A disk-shaped plastic body according to claim 1, wherein the cup-shaped film (1) and the lid-shaped film (9) are formed integrally directly on the filler body (5, 7) in the plastic injection molding process, wherein lateral attachments (2) formed integrally on the cup-shaped film (1) and the lid-shaped film (9) extend around the outer edge of the filler body (5, 7) in the injection molding process and are injection-molded and form edge markings.

6. A disk-shaped plastic body according to claim 1, wherein the films (1, 9) are injection-molded and graphically designed, the graphic design being formed within.

7. A disk-shaped plastic body according to claim 1, wherein the filler body comprises a filler body upper portion (5) and a filler body lower portion (7) joined and/or meshed together in form-locking relationship.

8. A disk-shaped plastic body according to claim 7, wherein the filler body upper portion (5) and the filler body lower portion (7) comprise an annular body, which in each case define central recesses (14, 20) facing towards each other.

9. A disk-shaped plastic body according to claim 8, wherein the recesses (14, 20) can be laid in an inlay portion (12).

10. A disk-shaped plastic body according to claim 9, wherein the inlay portion (12) is a transponder.

11. A disk-shaped plastic body according to claim 1, wherein on the top surface of the filler body lower portion (7) are arranged axially upwardly directed knobs (15), distributed regularly over the circumference, which engage in and can be latched to associated recesses (16) which are provided on the inside of the filler body upper portion.

12. A disk-shaped plastic body according to claim 1, wherein the two filler body portions (5, 7) each form peripheral edge segments (13, 13a), and between two adjacent edge segments (13a, 13) there are provided corresponding outwardly opening edge recesses.

13. A disk-shaped plastic body according to claim 12, wherein in the edge recesses (17) engage associated radial attachments (10, 2) which are provided on the films (1, 9).

14. A disk-shaped plastic body according to claim 1, wherein the filler body upper portion (5) comprises at least one axially downwardly directed edge attachment (18) which engages in an associated outwardly opening edge recess (19) which is provided in the filler body lower portion (7), so that the two filler body portions (5, 7) interlock in form-locking relationship and complement each other.

15. A disk-shaped plastic body according to claim 1, wherein the filler body (5, 7) is made of a plastic material doped with zinc or other metals.

16. A disk-shaped plastic body according to claim 1, wherein the filler body (5, 7) contains filler materials.

17. A disk-shaped plastic body according to claim 1, wherein the filler body (5, 7) is made by plastic injection molding.

* * * * *